United States Patent
Relan

(10) Patent No.: US 10,958,654 B1
(45) Date of Patent: Mar. 23, 2021

(54) RESOURCE DELETION PROTECTION SERVICE

(71) Applicant: Amazon Technologies, Inc., Seattle, WA (US)

(72) Inventor: Vivek G. Relan, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 130 days.

(21) Appl. No.: 16/022,383

(22) Filed: Jun. 28, 2018

(51) Int. Cl.
*H04L 29/06* (2006.01)
*G06F 9/455* (2018.01)

(52) U.S. Cl.
CPC .......... *H04L 63/10* (2013.01); *G06F 9/45558* (2013.01); *G06F 2009/45562* (2013.01)

(58) Field of Classification Search
CPC .............. H04L 63/10; G06F 9/45558; G06F 2009/45562
See application file for complete search history.

(56) References Cited

U.S. PATENT DOCUMENTS

| | | | |
|---|---|---|---|
| 9,882,775 B1 | 1/2018 | Allen | |
| 9,971,621 B1* | 5/2018 | Berg | G06F 9/45558 |
| 10,300,394 B1* | 5/2019 | Evans | G06F 3/048 |
| 10,474,372 B1* | 11/2019 | Olson | G06F 3/0671 |
| 2016/0093078 A1* | 3/2016 | Davis | G06F 16/58 345/629 |
| 2016/0323197 A1* | 11/2016 | Guzman | G06F 9/5083 |
| 2018/0241812 A1* | 8/2018 | Marchetti | H04L 41/147 |
| 2019/0220298 A1* | 7/2019 | Jiao | G06F 9/45558 |

* cited by examiner

*Primary Examiner* — Mahfuzur Rahman
(74) *Attorney, Agent, or Firm* — Nicholson De Vos Webster & Elliott LLP

(57) ABSTRACT

Techniques for resource protection are described. A resource protection service can determine whether it is safe to delete a resource based on current or projected usage of the resource. The resource protection service can retrieve usage data from a usage monitoring service and compare the usage data to a threshold for resource deletion. When a request to delete a resource is received by a service the service can first check with the resource protection service. The resource protection service fetches current usage data and determines whether it is safe to delete the resource based on the threshold. The resource protection service can return an approve/deny deletion message to the service, which may then either delete the service or provide an error message to the requestor.

13 Claims, 8 Drawing Sheets

RESOURCE DELETION PROTECTION SERVICE

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for resource deletion protection are described. Customers may access a provider network using application programming interfaces (APIs) to perform create, read, update and delete (CRUD) operations on various resources available through the provider network to build custom applications. Access to these resources may be controlled using an access management system, such as an identity management system (IdM). However, a privileged user may accidentally delete critical resources which may impact application performance and/or availability. For example, accidentally deleting a production machine image may result in instance launch failures when attempting to scale during a service's peak time, causing service availability issues. Embodiments detailed herein prevent privileged users from deleting important or critical resources, such as when resources are serving production traffic and/or running critical workloads. A resource protection service can determine whether a given resource is allowed to be deleted based on current and/or predicted usage metrics, for example, to prevent these problems resulting from accidental resource deletions.

Figure 1:
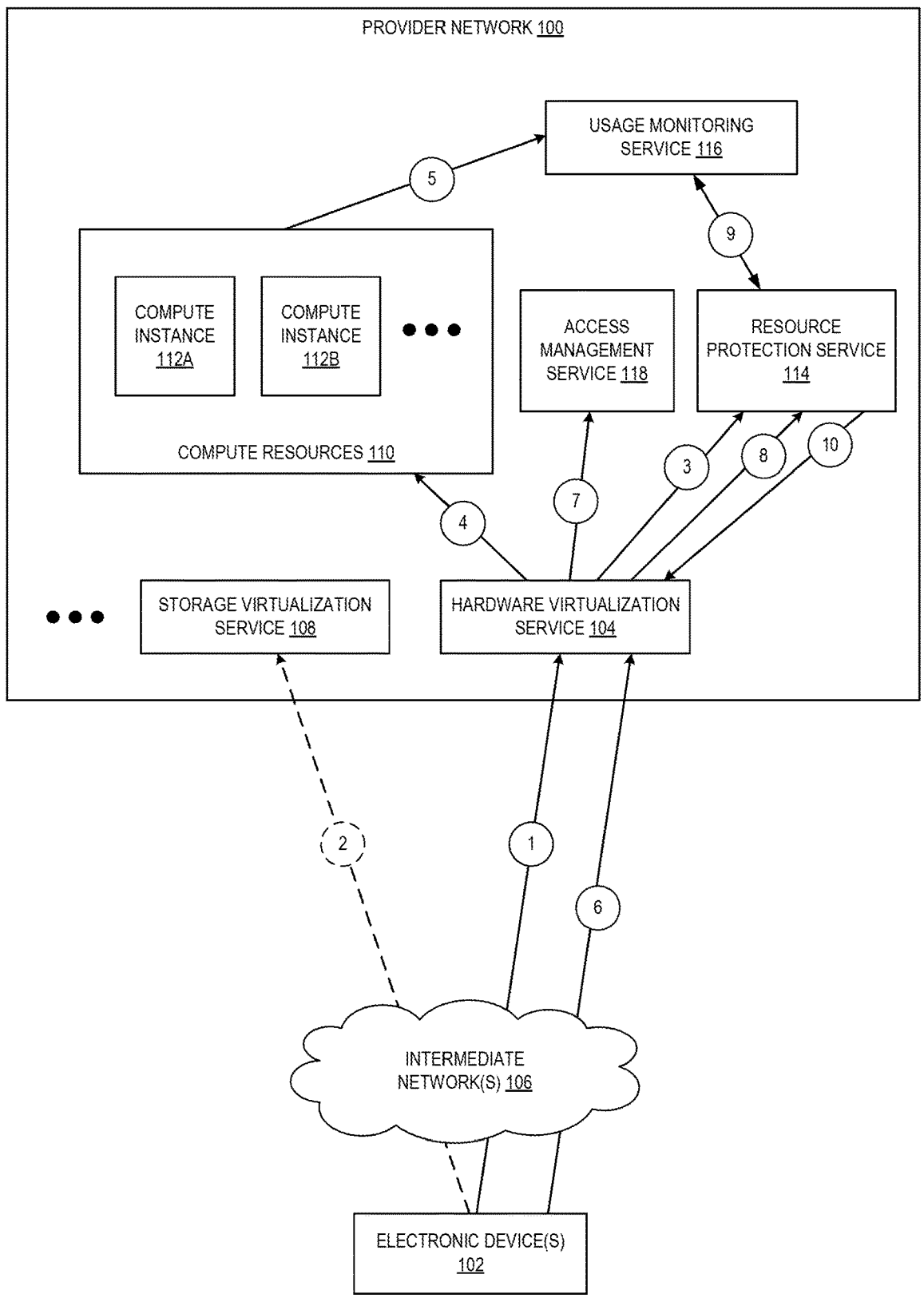
FIG. 1 is a diagram illustrating an environment for resource deletion protection of new resources according to some embodiments.

FIG. 1 is a diagram illustrating an environment for resource deletion protection of new resources according to some embodiments. A resource protection service 114 may be implemented within a provider network 100 to product compute resources implemented in/by the provider network 100. Generally, a provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, queues, machine images, routers and other data processing resources, etc. These and other computing resources may be provided as services, such as a hardware virtualization service 104 that can execute compute instances 112A-112B, a storage virtualization service 108 that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internal via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In some embodiments, an electronic device 102 (e.g., a customer device such as a personal computer (PC), laptop, mobile device, etc.), can access one or more services of a provider network 100 over one or more intermediate networks 106. For example, as shown at numeral 1, electronic device 102 may access hardware virtualization service 104 using an application programming interface (API) provided by the hardware virtualization service. The customer, using electronic device 102 can request the creation of one or more resources using a create API call, which may be carried by one or more HyperText Transport Service (HTTP) messages as a "web service" type call. As used herein, resources can include a variety of interrelated computing resources such as, for example, server instances, database instances, load balancer instances, other software components, as well as various types of associated system configurations, networking configurations, security configurations, and so forth. In this example, compute resources 110, including compute instances 112A-112B, may be created by hardware virtualization service 104. Similarly, other resources may be created or stored by other services in provider network 100. For example, at numeral 2, electronic device 102 can optionally send a request to storage virtualization service 108 to create one or more storage instances in provider network 100, upload a resource to the storage virtualization service 108, etc.

A create API call (also referred to herein as a "create request") may include a field, flag, or other indication that the associated new resource(s) (being requested to be created) is to be protected by a resource protection service 114. In some embodiments, the create request may also include a usage threshold for the resource that indicates whether the resource is in use. The usage threshold may vary from resource type to resource type. For example, a database table may be in use if it is servicing more than a threshold number of transactions per second while a compute instance may be in use if it is serving customer traffic. Some resources may be associated with usage thresholds that are based on custom usage metrics. For example, a machine image used to auto-scale compute instances may be in use if more than a threshold number of instances based on that image are active. When a create request including such an indication is received, the service can send a message to resource protection service 114 to register the new resource(s) with the resource protection service. The message may include a resource identifier associated with the new resource(s) and the usage threshold, if it was included in the create request. In the absence of a provided usage threshold, the resource protection service may use a default usage threshold based on a type of the new resource. For example, at numeral 3, a message can be send from hardware virtualization service 104 to resource protection service 114 to register newly requested compute instances 112A and 112B with the resource protection service. Each new compute instance may be associated with a usage threshold provided in the create request or a default usage metric (e.g., customer traffic measured in data/second, requests/second, etc.). In some embodiments, the customer may choose to register some newly-created resources but not others. For example, compute instance 112A may be registered while compute instance 112B may not be registered. At numeral 4, the new resources may be created. Although shown sequentially, in some embodiments, the new resources may be created in parallel with the registration of the new resources, or the new resources may be created first and then registered with the resource protection service. Similarly, in some embodiments an already-existing resource may be modified (e.g., via a "modify" resource API call) to indicate that one or more resources are to now be protected by the resource protection service 114 and/or specify or update a usage threshold, etc.

At numeral 5, the newly created resources can publish usage data to a usage monitoring service 116. In some embodiments, a usage monitoring service 116 of the provider network 100 is a logically centralized entity that collects and tracks metrics, or collects and monitors log files, etc., for resources within the provider network. The usage monitoring service 116 may collect usage data from various resources created and/or managed by various services provided by provider network 100.

At numeral 6, a customer (or a service operating on behalf of a customer) may request the deletion of a resource. Embodiments described herein use the term "deleting" generally for ease of explanation. However, deleting a resource may involve different actions depending on the type of resource being deleted. In the following example, a compute instance is deleted. In various embodiments, "deletion" of a compute instance may include shutting the compute instance down (e.g., "terminating" the compute instance). Once terminated, compute instance may still exist in memory but is no longer active and/or accessible to customers and/or may not have new work assigned to it. In this example, a delete API call may be sent from electronic device 102 to hardware virtualization service 104 that indicates a request to delete compute instance 112A and/or 112B. At numeral 7, hardware virtualization service 104 can determine whether an entity (e.g., a user account) associated with the delete request is authorized to perform the deletion with access management service 118. Access management service 118 can be an Identity Management (IdM) system or other access control system used to determine whether the requestor is authorized to perform the requested action. Although access management service 118 is shown as part of provider network 100, in various embodiments, access management service 118 may be an external identity management and/or authorization service such as a lightweight directory access protocol (LDAP) service or other directory service. Different users may be authorized to perform different actions, for example some users may be authorized to only perform read actions, while other users may be authorized to modify or delete resources. If the requestor is not authorized to perform the delete action, the service that received the delete API call may not continue processing a deletion, e.g., by sending or otherwise providing an "error" message to the requesting user.

However, when the requestor is authorized to perform the delete action, the hardware virtualization service 104 can determine whether the resource is protected. In some embodiments, each service may maintain a data structure that identifies which resources are registered with resource protection service 114. The data structure may include the resource identifier for each resource created by that service registered with the resource protection service. If the resource to be deleted is not registered, then the resource can be deleted after the requestor has been authorized. If the resource to be deleted is registered as being protected, a request can be sent at numeral 8 to resource protection service 114 to determine whether the resource can be deleted.

At numeral 9, the resource protection service 114 can retrieve usage data for the resource from usage monitoring service 116. In some embodiments, the usage data may include current usage data and/or usage prediction data for a future time period. Resource protection service 114 can compare the usage data to a usage threshold (e.g., provided by the user as part of a create API request shown at numeral 1, a modify API request, etc., or statically or dynamically set by the resource protection service 114 according to heuristics, models, etc.) associated with the resource to be deleted. If the usage data is below the usage threshold (e.g., indicating that the resource is not in use, not having "enough" use), then at numeral 10 a response can be returned from the resource protection service 114 to the requesting service (as shown, hardware virtualization service 104) indicating it is safe to delete the resource. The service may then perform a deletion workflow to delete the requested resource or resources. In this example, for instance, the deletion workflow may include sending a request from the hardware virtualization service to a hypervisor to terminate the compute instance being deleted.

If the usage data is above the usage threshold (e.g., if the usage data indicates the resource is in use), then at numeral 10 resource protection service 114 can return an error. For example, the error may be an HTTP 403 error with a message indicating the usage data and the usage threshold. The resource protection service 114 can send the error message to the service (in this example, hardware virtualization service 104), and the service may then act as a proxy and provide the error message (or a processed version thereof) to the customer via electronic device 102. In some embodiments, the error may include a link to perform forced deletion of the resource. Forced deletion may require additional user credentials from one or more other users—e.g., an owner of a customer account upon which the user operates under, an administrator, etc.—to confirm that the deletion can be performed. If the additional credentials are received and authorized by access management service 118, then a response can be returned to the service indicating it is safe to delete the resource. The service may then perform a deletion workflow to delete the requested resource or resources.

In some embodiments, a customer may configure custom metrics to be published by their resources and/or applications built on those resources to usage monitoring service 116. For example, a customer application may publish a metric which indicates how many compute instances are in use based on a given machine image. A usage threshold may be defined for the machine image based on how many compute instances are in use. If the usage threshold is zero, then the machine image cannot be deleted unless no running compute instances are based on it.

In some embodiments, resource protection service 114 may protect resources based on how a customer's application is structured. For example, a customer may define a dependency graph which indicates which resources in a given application depend on other resources. For example, a load balancer may manage traffic among several compute instances. In the dependency graph the compute instances may be shown as dependent on the load balancer. If a delete request is received for the load balancer, the resource protection service can determine, based on the dependency graph, whether the load balancer has any dependencies. If the dependent compute instances are running, then the delete request may be denied. In some embodiments, a message may be sent with the denial response indicating which dependent resources are running. Similarly, a router may be serving a particular amount of traffic for a customer application. If an attempt is made to delete some of the routes managed by the router then the resource protection service may deny the request based on the amount of traffic associated with those routes.

Figure 2:
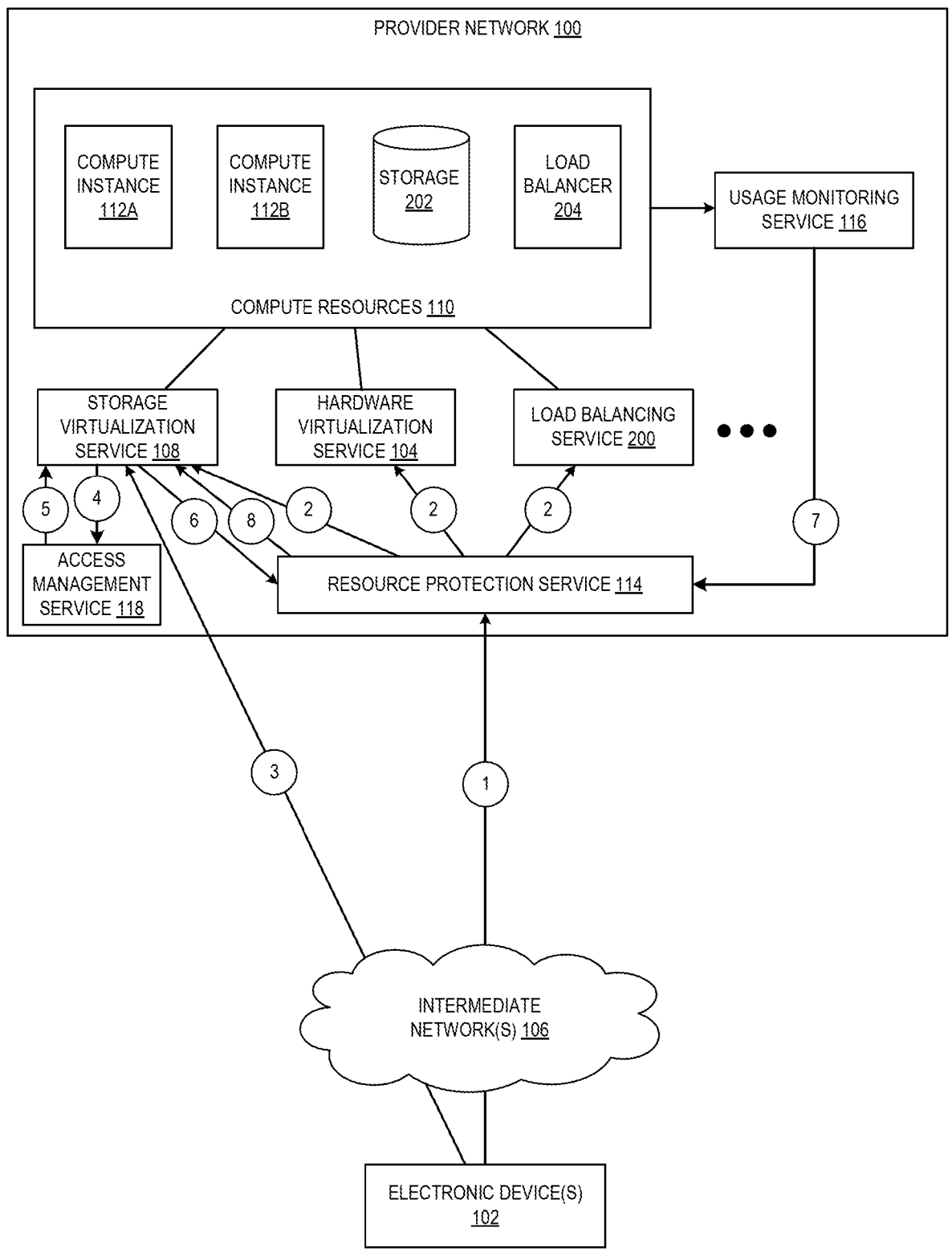
FIG. 2 is a diagram illustrating an environment for resource deletion protection of existing resources according to some embodiments.

FIG. 2 is a diagram illustrating an environment for resource deletion protection of existing resources according to some embodiments. In some embodiments, resource protection service 114 can be accessed by a customer device, such as electronic device 102, directly. For example, a customer may have existing resources already deployed, such as compute resources 110 including compute instances 112A and 112B, storage instance 202, and a load balancer instance 204. At numeral 1, the electronic device 102 can access the resource protection service 114 through a user interface, such as a graphical user interface (GUI) or API. The customer can provider a list a resource identifiers and usage thresholds. As described above, in some embodiments, if a usage threshold is not provided a default threshold may be used based on the type of resource being protected.

At numeral 2, resource protection service 114 can notify each service associated with the listed resources of the resources being protected. For example, the resource protection service can notify load balancing service that load balancer 204 is protected, storage virtualization service 108 that storage instance 202 is protected, hardware virtualization service 104 that compute instances 112A and 112B are protected, etc. As discussed above, each service may maintain a data structure of resource identifiers for those resources that are protected by resource protection service 114. Because these resources are already in use, each resource is publishing usage data to a usage monitoring service 116. As discussed, a usage monitoring service 116 of the provider network 100 is a logically centralized entity that collects and tracks metrics, or collects and monitors log files, etc., for resources within the provider network.

At numeral 3, a customer may request the deletion of a resource directly with the service. In this example, a delete API call may be sent from electronic device 102 to storage virtualization service 108, to delete storage instance 202. At numeral 4, storage virtualization service 108 can determine whether an entity associated with the delete request is authorized to perform the deletion with access management service 118. As discussed, access management service 118 can be an IdM system or other access control system used to determine whether the requestor is authorized to perform the requested action. If the requestor is authorized to perform the delete action, then storage virtualization service can determine whether the resource is protected. Since storage instance 202 is registered with resource protection service 114, a request can be sent at numeral 6 to resource protection service 114 to determine whether the resource can be deleted.

At numeral 7, the resource protection service 114 can retrieve usage data for the resource from usage monitoring service 116. In some embodiments, the usage data may include current usage data and/or usage prediction data for a future time period. Resource protection service 114 can compare the usage data to the usage threshold associated with the resource to be deleted. If the usage data is below the usage threshold (e.g., indicating that the resource is not in use), then at numeral 8 a response can be returned to the service indicating it is safe to delete the resource. The service may then perform a deletion workflow to delete the requested resource or resources. If the usage data is above the usage threshold (e.g., if the usage data indicates the resource is in use), then at numeral 8 resource protection service 114 can return an error, as discussed above.

Figure 3:
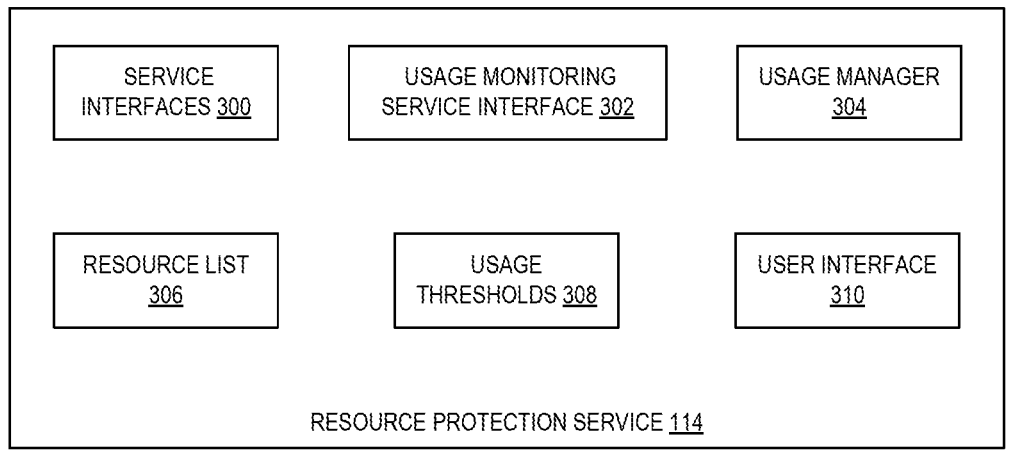
FIG. 3 is a diagram of a resource protection service according to some embodiments.

FIG. 3 is a diagram of a resource protection service according to some embodiments. As shown in FIG. 3, resource protection service 114 may include one or more service interfaces 300. Each service interface may be associated with a different service in a provider network (e.g., storage virtualization service, hardware virtualization service, load balancing service, etc.). As discussed above, the resource protection service may receive messages indicating new resources have been created by services through the service interface. The resource protection service may also notify services of resources which have been registered directly with the resource protection service through user interface 310. Deletion requests and approval/deny responses may also be communicated through the service interfaces 300. Usage monitoring service interface 302 may enable the resource protection service 114 to retrieve usage data for a given resource from the usage monitoring service.

As discussed, the resource protection service may maintain a list of resources 306 which have been registered with the resource protection service. The list of resources may include a resource identifier for each resource registered with the resource protection service. The resource protection service 114 may also maintain at least one usage threshold for each registered resource. As discussed, the thresholds may be provided by the customer to whom the resource belongs or may be default thresholds determined based on the resource type. A usage manager 304 may be configured to compare the usage data retrieved through usage monitoring interface 302 to the usage thresholds 308 and determine whether a resource may be deleted. The usage manager 304 can return a message indicating approval or denial of the deletion request through service interface 300 to the service.

Figure 4:
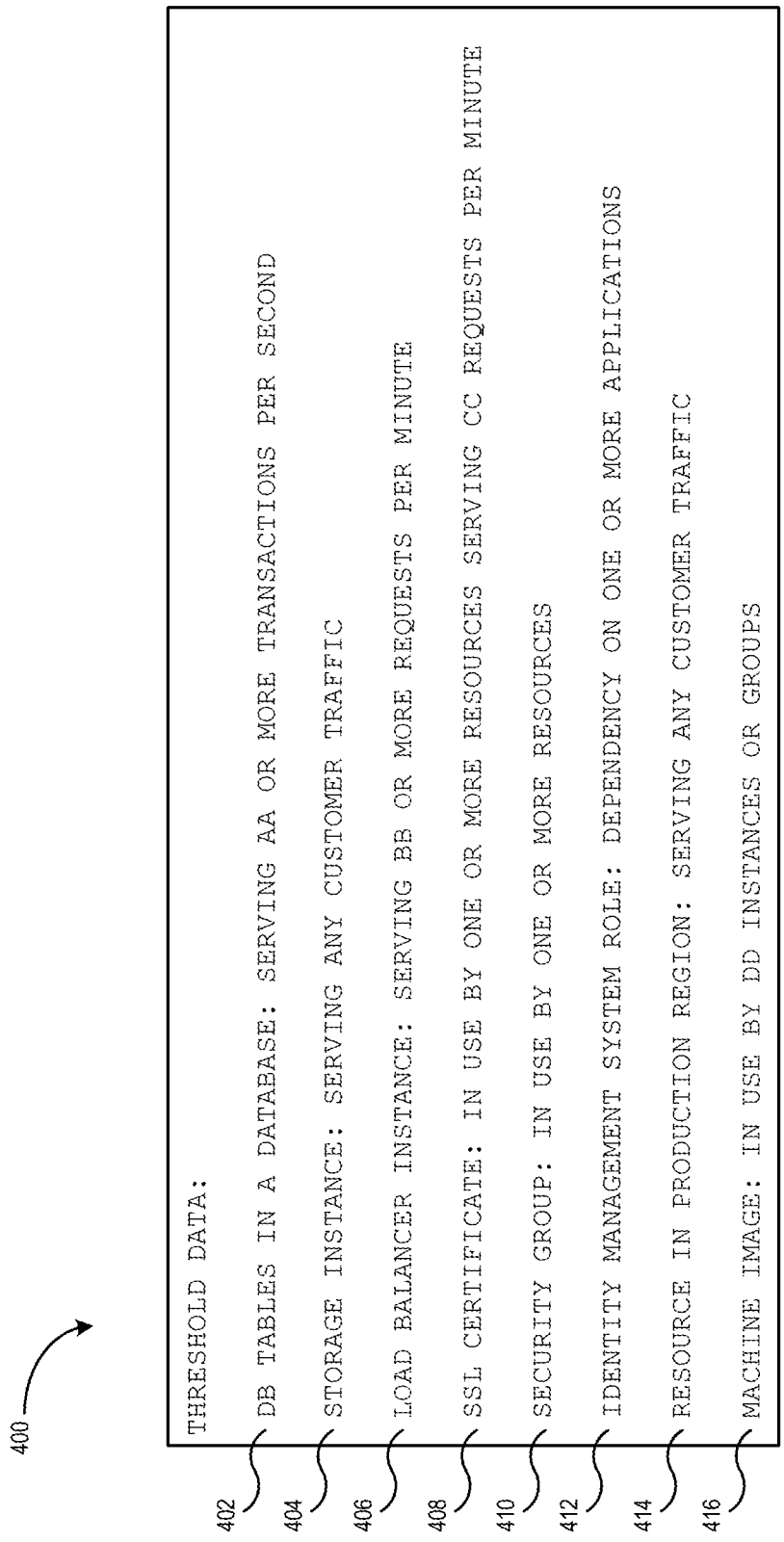
FIG. 4 illustrates examples of usage thresholds according to some embodiments.

FIG. 4 illustrates examples 400 of usage thresholds for different types of resources according to some embodiments. As shown in FIG. 4, database tables 402 may be associated with a usage threshold in units of transactions per second. Accordingly, if the usage data shows a database table requested to be deleted is serving more than some threshold number (or "AA") of transactions per second, then the database table cannot be deleted. A storage instance 404 may be associated with a threshold based on a quantity of customer traffic. A load balancer instance 406 may be associated with a threshold based on a quantity of requests being serviced per minute (or other unit of time). Similarly, an SSL certificate 408 may be associated with a threshold based on a quantity of requests being serviced per minute (or other unit of time). A security group 410 may be associated with a threshold based on a number of resources belonging to the security group. An identity management system role 412 may be associated with a threshold based on a dependency of one or more applications that use the role. Other resources 414 in a production network area/region may be associated with a threshold based on a quantity of customer traffic. A machine image 416 may be associated with a threshold based on a number of active instances that are based on the machine image and/or a number of auto-scaling groups utilizing the machine image.

Figure 5:
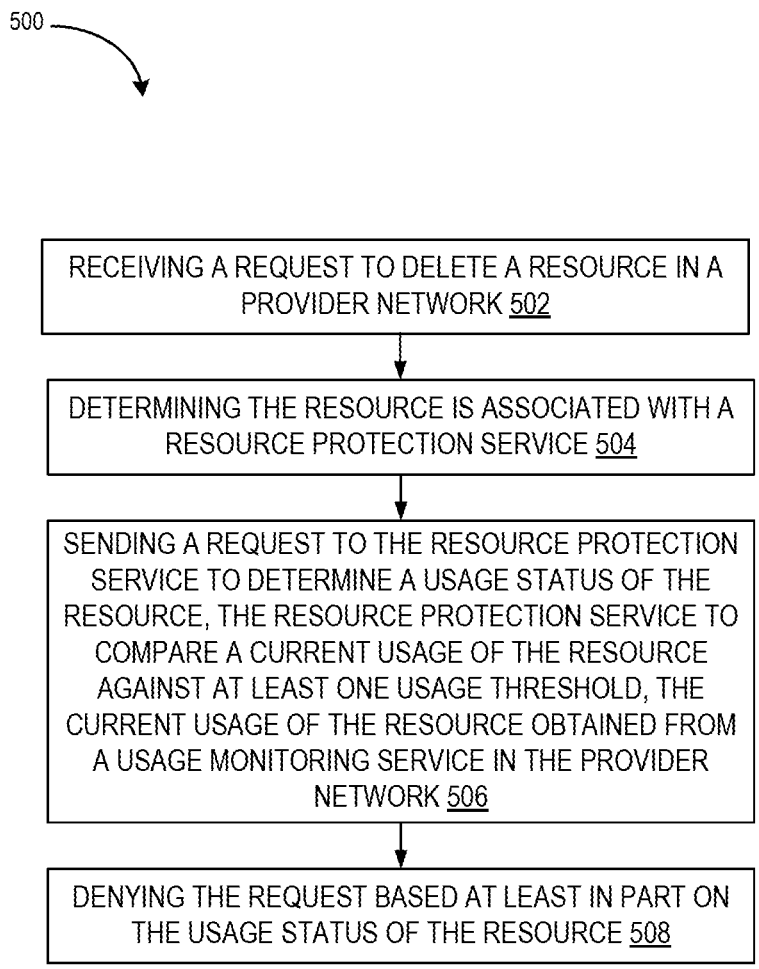
FIG. 5 is a flow diagram illustrating operations for resource deletion protection according to some embodiments.

FIG. 5 is a flow diagram illustrating operations 500 for resource deletion protection according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by hardware virtualization service 104, storage virtualization service 108 or other service of provider network 100, resource protection service 114, usage monitoring service 116, access management service 118, etc., of the other figures.

The operations 500 include, at block 502, receiving a request to delete a resource in a provider network. As discussed above, the request may be received by a service in provider network 100, such as hardware virtualization service 104, storage virtualization service 108, or other service of provider network 100. The request may identify the resource or resources to be deleted using resource identifiers. In some embodiments, the resource may include at least one of a compute instance, a storage instance, a load balancer instance, a database table, or a machine image.

The operations 500 include, at block 504, determining the resource is associated with a resource protection service. For example, the service described above with respect to block 502 may maintain a data structure that indicates which resources are protected by resource protection service 114. The data structure may include a resource identifier for each protected resource. In some embodiments, the resource protection service includes a dependency model for resources in an application, and wherein the usage status for the resource is determined using the dependency model.

The operations 500 include, at block 506, sending a request to the resource protection service to determine a usage status of the resource, the resource protection service to compare a current usage of the resource against at least one usage threshold, the current usage of the resource obtained from a usage monitoring service in the provider network. For example, the service described above with respect to block 504 can send the request to the resource protection service. In some embodiments, the current usage is a customer-defined metric published by the resource. In some embodiments prior to sending the request to the resource protection service, the operations may include sending a request to an access management service to authorize a requestor associated with the request to delete the resource, and receiving an authorization response indicating the requestor is authorized.

The operations 500 include, at block 508, denying the request based at least in part on the usage status of the resource. In some embodiments, the service, described above with respect to block 506 can receive a usage status response. The usage status response may include current usage data for the resource and/or the usage threshold for that resource. In some embodiments, an error message can be returned, the error message indicating the usage status of the resource. The service, described above with respect to block 508 can return the error message. In some embodiments, the error message can be generated and returned by the service or can be generated by the resource protection service and returned by the service as a proxy. In some embodiments, the error message further indicates one or more of the resources in the application that are dependent on the resource. In some embodiments, the operations may include receiving a force delete request, the force delete request including at least one additional requestor credential, authorizing the at least one additional requestor credential, and deleting the resource from the provider network.

In some embodiments, the operations 500 may include receiving a second request to delete a second resource in the provider network, sending a second request to the resource protection service to determine a usage status of the second resource, receiving a second usage status response from the resource protection service indicating the second resource is not in use, and deleting the second resource from the provider network.

In some embodiments, the resource protection service can receive, via a user interface. a registration request, the registration request including a of resource identifier for a second compute instance that is running.

Figure 6:
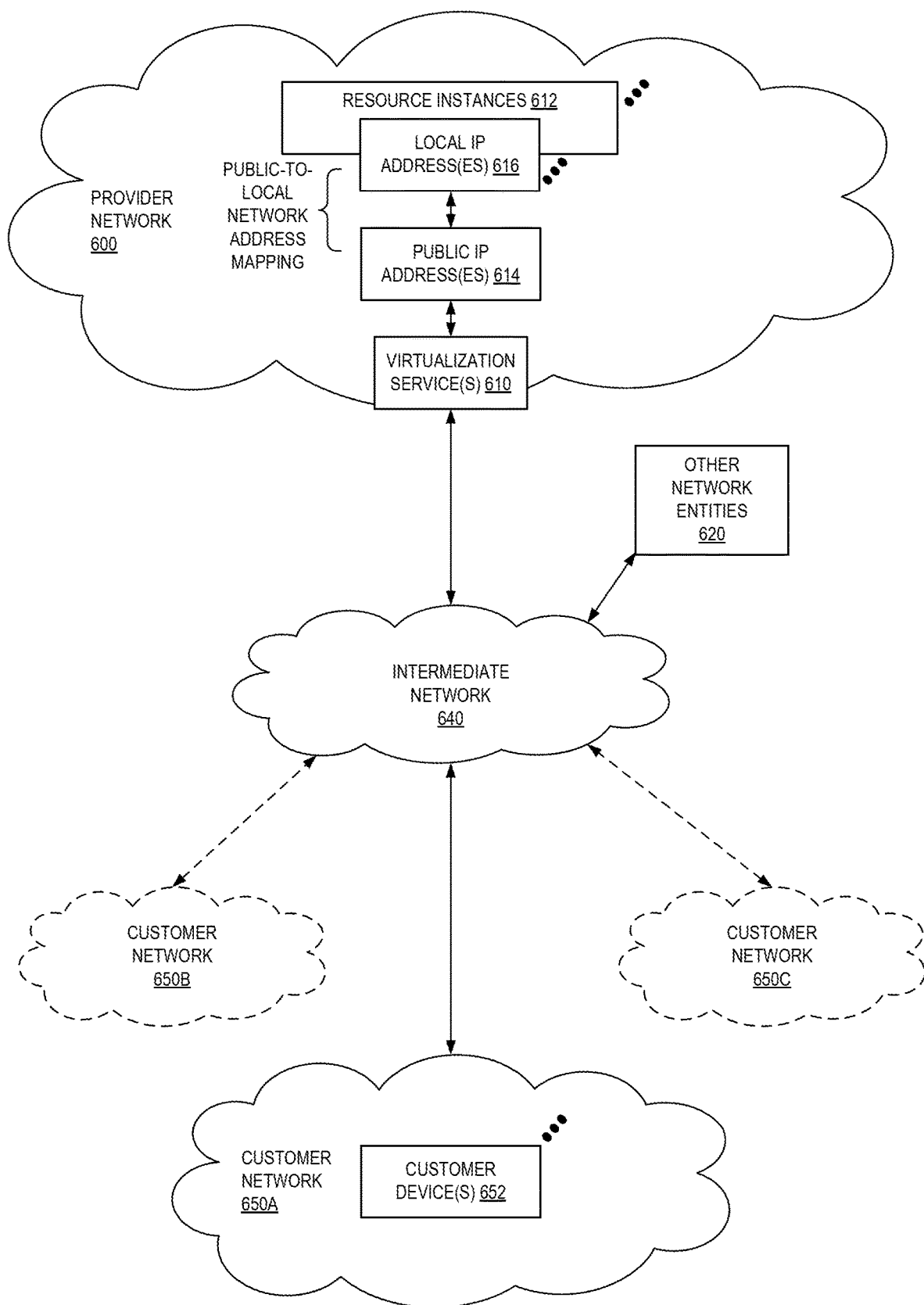
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
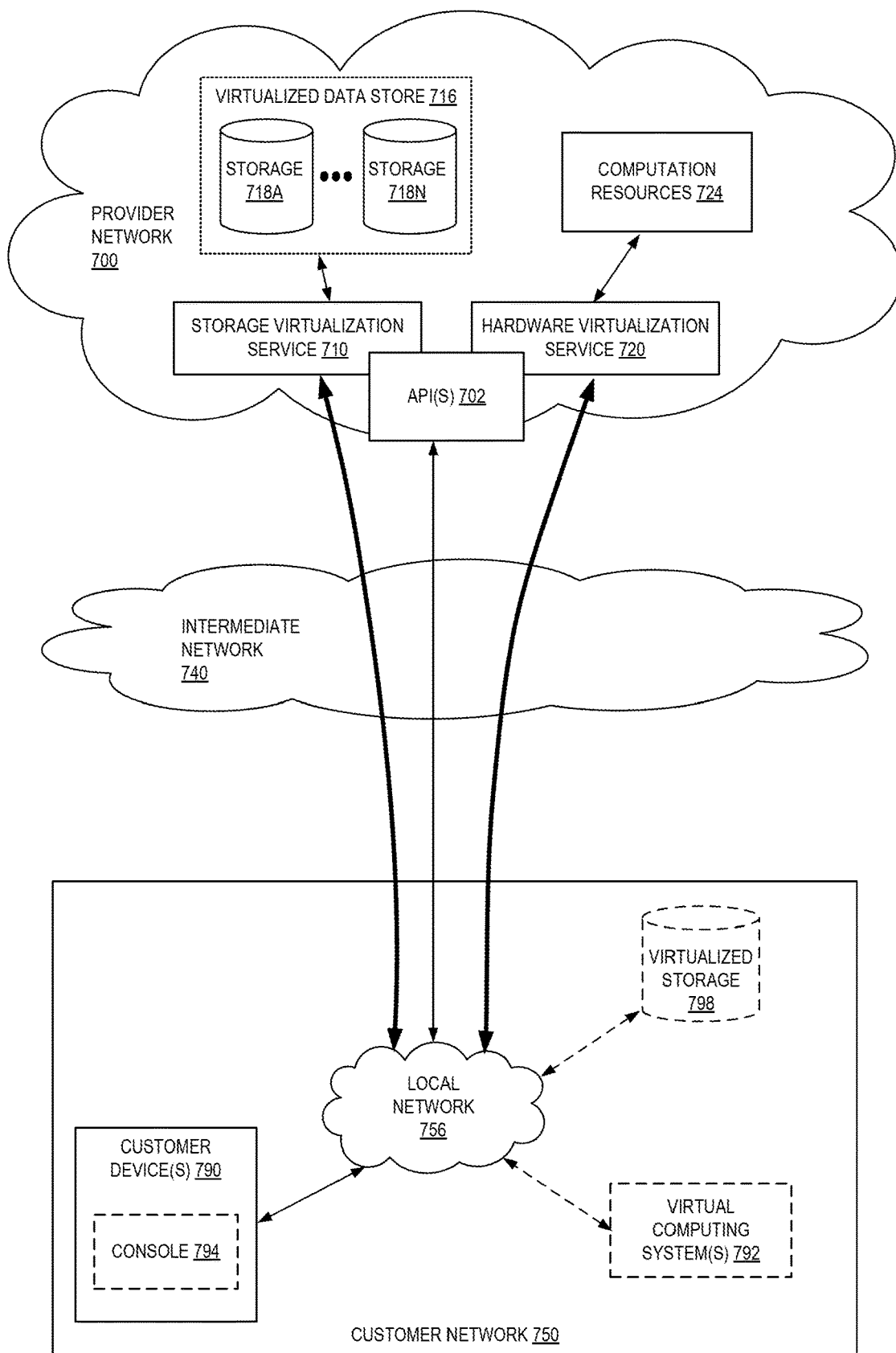
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
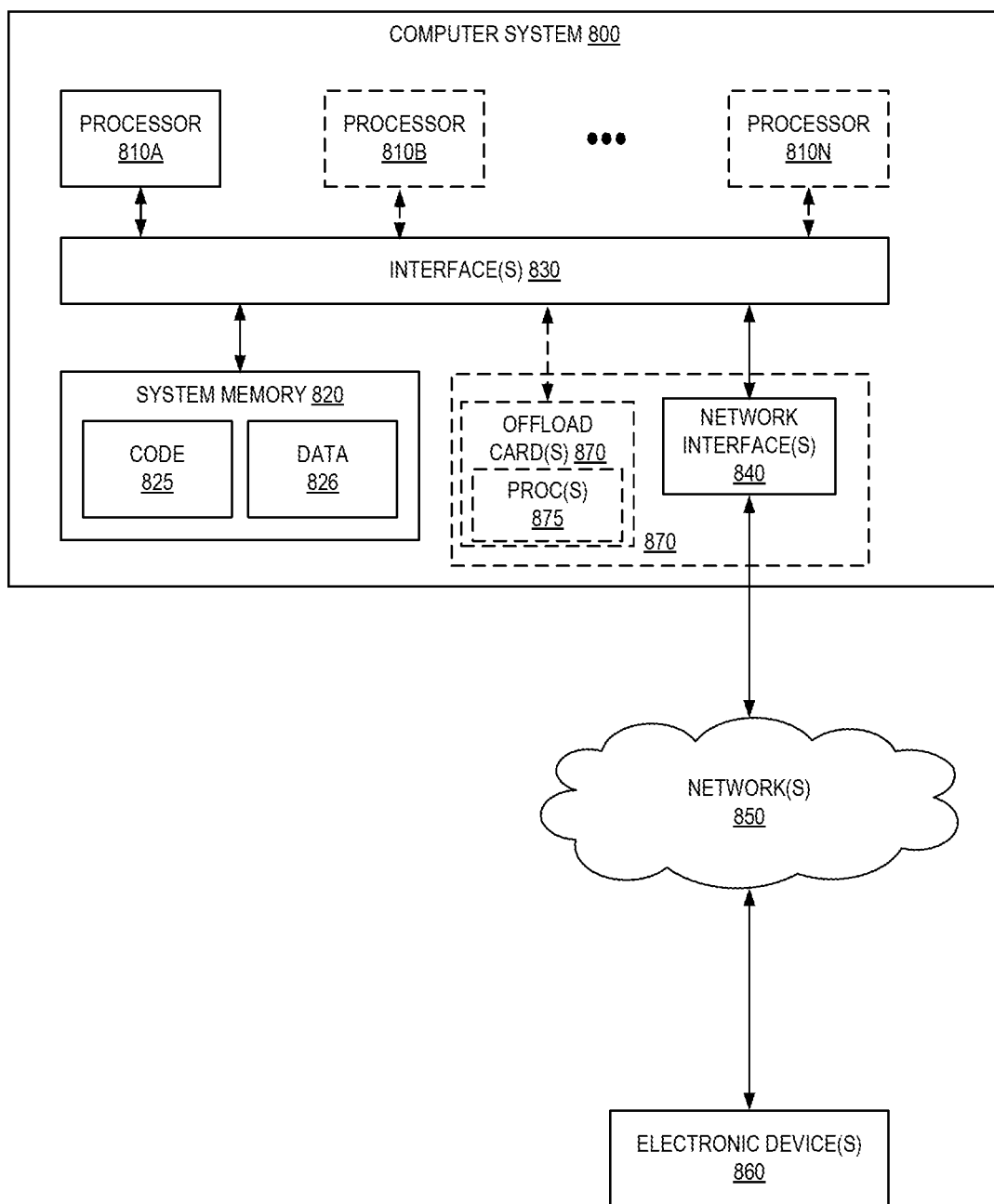
FIG. 8 is a block diagram illustrating an example computer system that may be used in some embodiments.

In some embodiments, a system that implements a portion or all of the techniques for resource deletion protection as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 112A-112B, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request, by a hardware virtualization service in a provider network, to create a plurality of compute instances, the request indicating that at least a first compute instance of the plurality of compute instances is to be registered with a resource protection service and further indicating a usage threshold for the first compute instance;
creating the plurality of compute instances in the provider network;
receiving, by the hardware virtualization service, a request to terminate the first compute instance;
sending a request to the resource protection service to determine a usage status of the first compute instance, the resource protection service to compare a current usage of the first compute instance against the usage threshold, the current usage retrieved from a usage monitoring service in the provider network;
terminating the first compute instance based at least in part on a comparison of the current usage of the first compute instance against the usage threshold;
receiving, by the hardware virtualization service, a request to register a second compute instance with the resource protection service;
receiving, by the hardware virtualization service, a request to terminate the second compute instance; and
denying the request based at least in part on a determination that the second compute instance is in use.

2. The computer-implemented method of claim 1, wherein the request to register the second compute instance with the resource protection service is received via a user interface.

3. A computer-implemented method comprising:
receiving a request to delete a resource in a provider network;
determining the resource is associated with a resource protection service;
determining a requestor associated with the request is authorized to delete the resource;

sending a request to the resource protection service to determine a usage status of the resource, the resource protection service configured to compare a current usage of the resource against at least one usage threshold, the current usage of the resource obtained from a usage monitoring service in the provider network, the usage status determined based at least on a dependency model;

denying the request based at least in part on the usage status of the resource;

receiving a second request to delete the resource associated with a second requestor;

determining the second requestor is authorized to delete the resource; and deleting the resource from the provider network.

4. The computer-implemented method of claim 3, wherein the resource includes at least one of a compute instance, a storage instance, a load balancer instance, a database table, access policy, queue, or a machine image.

5. The computer-implemented method of claim 3, further comprising:

receiving a second request to delete a second resource in the provider network;

sending a second request to the resource protection service to determine a usage status of the second resource;

receiving a second usage status response from the resource protection service indicating the second resource is not in use; and deleting the second resource from the provider network.

6. The computer-implemented method of claim 3, wherein denying the request based at least in part on the usage status of the resource, further comprises:

providing an error message indicating one or more of the resources in the application are dependent on the resource.

7. The computer-implemented method of claim 3, further comprising:

receiving, via a user interface, a registration request, the registration request including a of resource identifier for a second compute instance that is running.

8. The computer-implemented method of claim 3, wherein the current usage is a customer-defined metric published by the resource.

9. A system comprising:

a first one or more electronic devices implementing a resource protection service, the resource protection service to compare a current usage of a resource against at least one usage threshold, the current usage of the resource obtained from a usage monitoring service in the provider network; and a second one or more electronic devices implementing a first service, the first service including instructions that upon execution cause the first service to:

receive a request to delete a resource in a provider network;

determine the resource is associated with a resource protection service;

determine a requestor associated with the request is authorized to delete the resource;

send a request to the resource protection service to determine a usage status of the resource, the resource protection service configured to compare a current usage of the resource against at least one usage threshold, the current usage of the resource obtained from a usage monitoring service in the provider network, the usage status determined based at least on a dependency model;

deny the request based at least in part on the usage status of the resource;

receive a second request to delete the resource associated with a second requestor;

determine the second requestor is authorized to delete the resource; and delete the resource from the provider network.

10. The system of claim 9, wherein the resource includes at least one of a compute instance, a storage instance, a load balancer instance, a database table, access policy, queue, or a machine image.

11. The system of claim 9, wherein the instructions, when executed, further cause the first service to:

receive a second request to delete a second resource in the provider network;

send a second request to the resource protection service to determine a usage status of the second resource;

receive a second usage status response from the resource protection service indicating the second resource is not in use; and delete the second resource from the provider network.

12. The system of claim 9, wherein to deny the request based at least in part on the usage status of the resource, the instructions, when executed, further cause the first service to:

provide an error message indicating one or more of the resources in the application are dependent on the resource.

13. The system of claim 9, wherein the resource protection service is further to:

receive, via a user interface, a registration request, the registration request including a of resource identifier for a second compute instance that is running.

\* \* \* \* \*